(12) United States Patent  
Herlihy et al.

(10) Patent No.: US 7,434,406 B2
(45) Date of Patent: Oct. 14, 2008

(54) DRIVE FOR USING A DIRECT DRIVEN GENERATOR TO START A COUNTER-ROTATING MULTI-SPOOL GAS TURBINE ENGINE

(75) Inventors: Christopher J. Herlihy, Scottsdale, AZ (US); John R. Barrett, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 508 days.

(21) Appl. No.: 11/126,847

(22) Filed: May 10, 2005

(65) Prior Publication Data

US 2006/0254253 A1 Nov. 16, 2006

(51) Int. Cl.
*F02C 7/26* (2006.01)
*F02C 7/32* (2006.01)
(52) U.S. Cl. .................. 60/788; 60/39.163; 60/802; 74/6
(58) Field of Classification Search .............. 60/39.163, 60/786, 787, 788, 802; 74/6, 7 R, 7 A, 7 E, 74/9; 244/53 A
See application file for complete search history.

(56) References Cited

U.S. PATENT DOCUMENTS

| | | | | |
|---|---|---|---|---|
| 2,663,994 | A | * | 12/1953 | Lombard et al. .............. 60/788 |
| 3,764,815 | A | | 10/1973 | Habock et al. |
| 3,772,526 | A | | 11/1973 | Alwers |
| 3,786,696 | A | | 1/1974 | Aleem |
| 3,793,905 | A | | 2/1974 | Black et al. |
| 3,902,073 | A | | 8/1975 | Lafuze |
| 4,315,442 | A | | 2/1982 | Cordner |
| 4,708,030 | A | | 11/1987 | Cordner |
| 4,772,802 | A | | 9/1988 | Glennon et al. |
| 5,028,803 | A | | 7/1991 | Reynolds |
| 6,035,626 | A | * | 3/2000 | Wahl et al. .................... 60/788 |
| 7,185,496 | B2 | * | 3/2007 | Herlihy ................... 60/39.163 |

* cited by examiner

*Primary Examiner*—Louis J Casaregola
(74) *Attorney, Agent, or Firm*—Ingrassia, Fisher & Lorenz, P.C.

(57) ABSTRACT

A drivetrain for a multi-spool counter rotating gas turbine engine may include a lay shaft for connecting a power turbine shaft of the engine with a gas generator shaft of the engine when the drivetrain is in engine start mode. In normal operation mode, an actuator disengages the lay shaft, thereby allowing free and independent rotation of the power turbine shaft and the gas generator shaft.

26 Claims, 4 Drawing Sheets

DRIVE FOR USING A DIRECT DRIVEN GENERATOR TO START A COUNTER-ROTATING MULTI-SPOOL GAS TURBINE ENGINE

BACKGROUND OF THE INVENTION

The present invention generally relates to a drivetrain for a gas turbine engine and, more specifically, to a drivetrain for using a direct driven generator as a starter motor for a gas turbine engine.

Some aircraft engines are started by devices, external to the aircraft, which supply torque to accelerate the engine up to its self-sustaining speed within a required time. It has long been recognized that to minimize weight, cost and complexity, it is desirable to utilize equipment already on the aircraft, or other gas turbine powered vehicle, for this purpose. A generating system can be used for engine starting by operating a generator as an electric motor.

The above described arrangement is generally referred to as a generator-starter drive. The generator-starter is usually located on a drivetrain connected only to the gas generator spool of a multi-spool engine so that the motor need not accelerate the other spools' inertia during engine startup.

U.S. Pat. No. 4,315,442 to Cordner describes a starter-generator drive using a differential and a hydrostatic transmission. The hydrostatic transmission is controlled to provide an energy-dissipating starting mode when the generator is operating as an electric motor to start the engine aircraft.

U.S. Pat. No. 4,708,030 also to Cordner describes a starter-generator drive having a multi-speed transmission for stepping the input speed from an engine to a hydro-viscous dissipative clutch to provide plural speed ranges of operation and thus limit the amount of slip that occurs within the clutch in each range to provide the constant speed drive of the generator.

Some hybrid vehicle applications require a gas turbine engine's output power be used to directly drive very large generators. As such these applications have the generators rotationally connected to the power turbine spool of the multi-spool engine. As can be seen, there is a need for an improved drivetrain that allows a multi-spool gas turbine engine, having counter-rotating main engine shafts, to directly drive an electrical generator at power turbine speed and, alternatively, use that generator as a starter motor for the engine thereby eliminating the need for a second motor for starting on a drivetrain isolated to the gas generator shaft.

SUMMARY OF THE INVENTION

In one aspect of the present invention, a drivetrain comprises a first shaft rotationally connected to a motor-generator; a second shaft rotationally connected to a gas generator; a lay shaft movable between a start position, wherein the first shaft is rotationally connected to the second shaft, and a disengaged position, wherein the first shaft rotates independently of the second shaft.

In another aspect of the present invention, a drivetrain of a two spool gas turbine engine comprises a first shaft rotationally connecting a motor-generator with the engine; a second shaft rotationally connected to a gas generator; wherein the first shaft rotates in a direction opposite of the direction of rotation of the second shaft; and a lay shaft movable between a start position, wherein the first shaft is rotationally connected to the second shaft, and a disengaged position, wherein the first shaft rotates independently of the second shaft.

In yet another aspect of the present invention, a drivetrain of a two spool gas turbine engine comprises a first shaft rotationally connecting a motor-generator with the engine; a second shaft rotationally connected to a gas generator, wherein the first shaft rotates in a direction opposite of the direction of rotation of the second shaft; a lay shaft movable between a start position, wherein the first shaft is rotationally connected to the second shaft, and a disengaged position, wherein the first shaft rotates independently of the second shaft; a pinion gear on a first end of the lay shaft; an intermediate gear on a second end of the lay shaft, wherein the pinion gear is rotationally connected to the power turbine shaft and the intermediate gear is rotationally connected to the gas generator shaft; an internal gear rotationally connected to the power turbine shaft, the internal gear capable of mating with the pinion gear when the drivetrain is in the start position; a gas generator gear attached to the gas generator shaft, the gas generator gear capable of mating with the intermediate gear when the drivetrain is in the start position; and an actuator for moving the lay shaft from the start position to the disengaged position.

In a further aspect of the present invention, a two spool gas turbine engine comprises a first shaft rotationally connecting a motor-generator with the engine; a second shaft rotationally connected to a gas generator; wherein the first shaft rotates in a direction opposite of the direction of rotation of the second shaft; and a lay shaft movable between a start position, wherein the first shaft is rotationally connected to the second shaft, and a disengaged position, wherein the first shaft rotates independently of the second shaft.

In still a further aspect of the present invention, a ground vehicle application comprises a gas turbine engine, the gas turbine engine having a drivetrain that comprises a first shaft rotationally connecting a motor-generator with the engine; a second shaft rotationally connected to a gas generator; wherein the first shaft rotates in a direction opposite of the direction of rotation of the second shaft; and a lay shaft movable between a start position, wherein the first shaft is rotationally connected to the second shaft, and a disengaged position, wherein the first shaft rotates independently of the second shaft, wherein the gas turbine engine drives a generator; and wherein the generator generates electrical power to drive the ground vehicle.

In yet a further aspect of the present invention, a method for starting an engine comprises rotationally connecting a first shaft and a second shaft of the engine by moving a lay shaft from a disengaged position to an engaged position; using a motor-generator as a starter motor to turn both the first shaft and the second shaft in opposite directions; developing sufficient velocity in the second shaft to permit the engine to sustain its own operation; and rotationally disconnecting a first shaft and a second shaft of the engine by moving a lay shaft from an engaged position to a disengaged position.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a drivetrain configuration using a direct driven motor-generator to start a counter-rotating two spool gas turbine engine. The drivetrain of the present invention may be useful in any apparatus having a two spool gas turbine engine, including ground vehicles, aircraft and electrical generation equipment.

Figure 1:
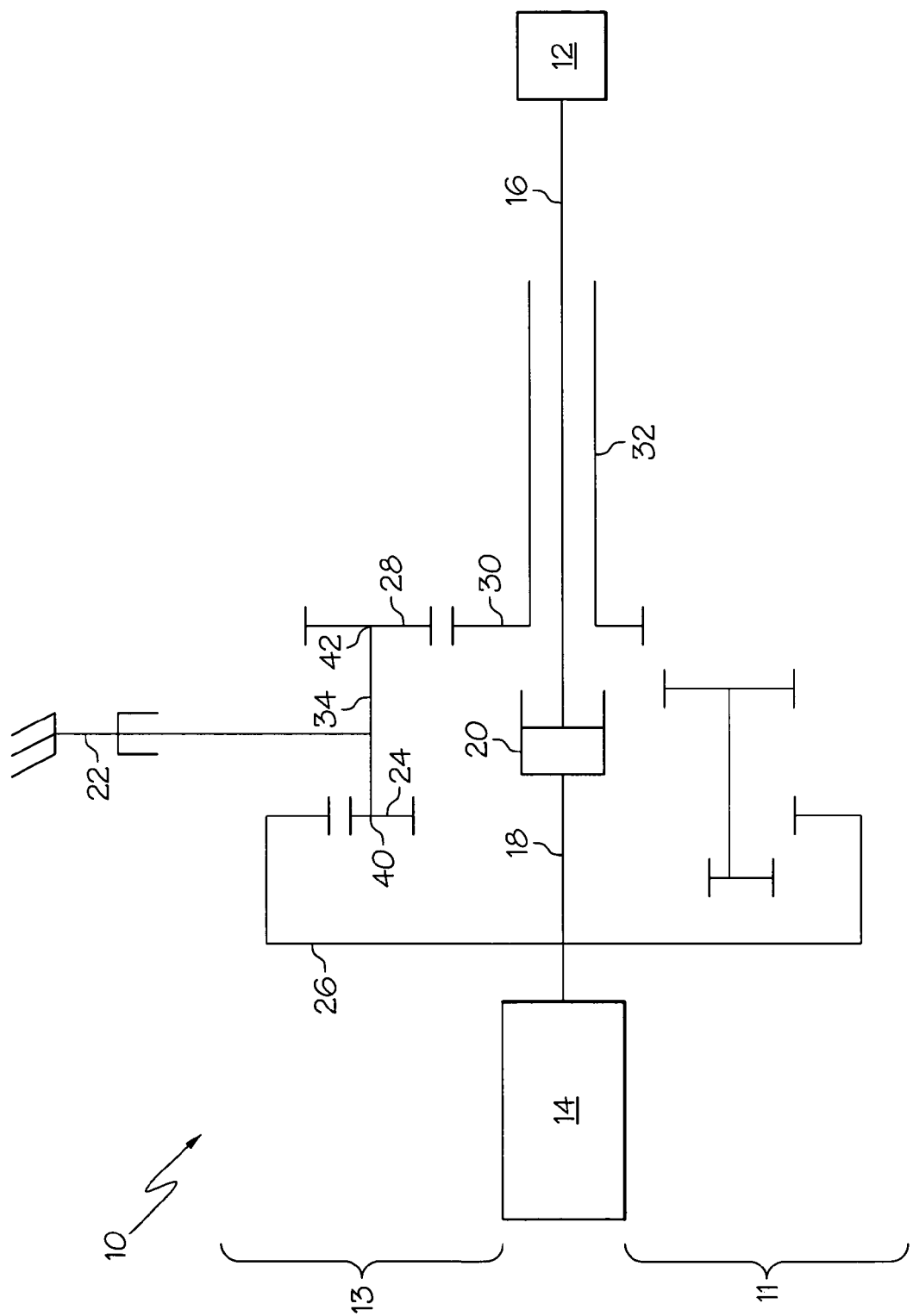
FIG. 1 is a schematic drawing depicting a drivetrain according to the present invention.

Unlike conventional drivetrains that may use various clutch and/or speed-control mechanisms isolated on a gas generator geartrain to use the motor-generator as a motor to start the engine, the present invention may start the gas generator while it is coupled to the power turbine Referring to FIG. 1, there is shown a schematic drawing of a drivetrain 10, in both normal engine operation and engine starting modes, according to the present invention. The bottom-half of FIG. 1 (depicted generally at 11) shows the drivetrain 10 in normal engine operation mode, while the upper-half of FIG. 1 (depicted generally at 13) shows the drivetrain 10 in engine starting mode. During normal engine operation, the power developed by a gas turbine engine (shown generally at 12) may be used to drive a motor-generator 14 by coupling a power turbine shaft 16 to a generator shaft 18 through a conventional spline connection 20 thereby rotationally coupling the motor-generator 14 with the power turbine shaft 16.

In the engine starting mode of operation, all components are initially at rest. An actuator 22 may be energized to move a pinion gear 24 to engage and mate with an internal gear 26 while simultaneously causing an intermediate gear 28 to engage and mate with a gas generator gear 30. A lay shaft 34 may rotationally connect the pinion gear 24 with the intermediate gear 28. A first end 40 of the lay shaft 34 may include the pinion gear 24, while a second end 42 of the lay shaft 34 may include the intermediate gear 28. Actuator 22 may be any type of actuator known in the art, such as but not limited to a pneumatic actuator, a hydraulic actuator or a fueldraulic actuator. The motor-generator 14 may then be inverted to be used as a starter-motor to drive both a gas generator shaft 32 and the power turbine shaft 16 which may now be coupled together through the engaged gear train (consisting of the actuator 22, the pinion gear 24, the internal gear 26, the intermediate gear 28 and the gas generator gear 30). It may be aerodynamically advantageous, and thus desirable for engine performance, to drive the power turbine shaft 16 and the gas generator shaft 32 in opposite directions. Gas generator shaft 32 may be rotationally connected to a gas generator (not shown).

The number of teeth on the gears 24, 26, 28 and 30 of the gear train may be chosen such that speeds of the shafts 16, 32 allow the motor-generator 14 to be inverted back to generator mode when the engine 12 is capable of sustaining its own operation. At that time, the lay shaft 34 may be disengaged by actuator 22 and may stop rotating (lower part 11 of FIG. 1). Rotational velocity of the power turbine shaft 16 in normal operation mode may between about 30,000 to about 40,000 rpm. Rotational velocity of the gas generator shaft 32 may vary with load and may be up to about 50,000 rpm.

The number of teeth for the internal mesh of the pinion gear 24 and the internal gear 26 may be between about 12 and 30 teeth for the pinion gear 24 and between about 90 and 110 teeth for the internal gear 26. In one embodiment, the pinion gear 24 may have eighteen (18) teeth and the internal gear 26 may have one hundred and one (101) teeth. The number of teeth for the external mesh of the intermediate gear 28 and the gas generator gear 30 may be between about fifty (50) and seventy (70) teeth for the intermediate gear 28 and between about thirty (30) and fifty (50) teeth for the gas generator gear 30. In one embodiment, the intermediate gear 28 may have fifty-nine (59) teeth and the gas generator gear 30 may have forty (40) teeth. It will be understood by one skilled in the art that the selection of gear size and ratios may be made as appropriate for the engine size, speed, generator size and similar characteristics.

Figure 2:
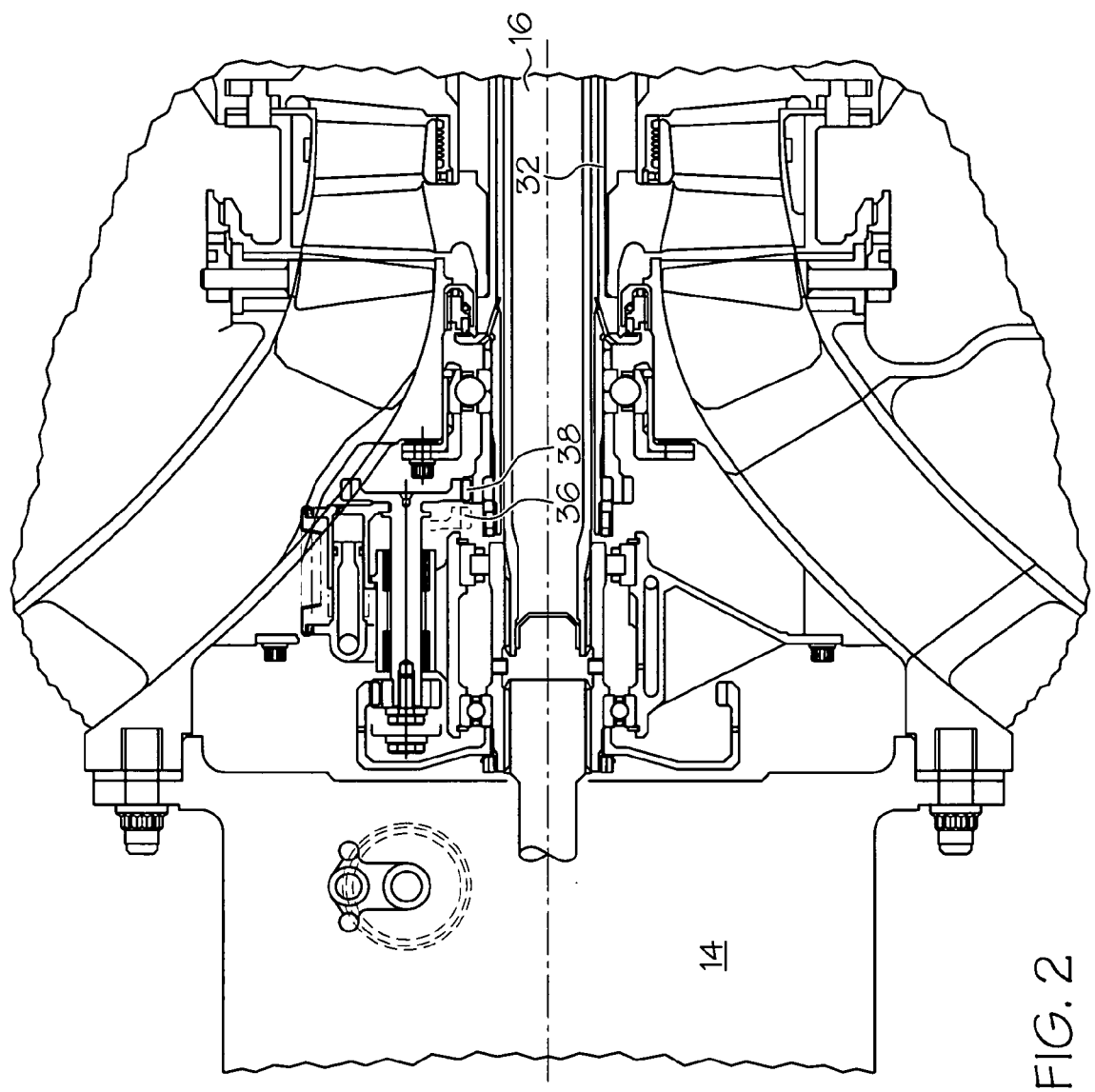
FIG. 2 is a partial cross-sectional drawing depicting an engine layout having the drivetrain of FIG. 1.
Figure 3:
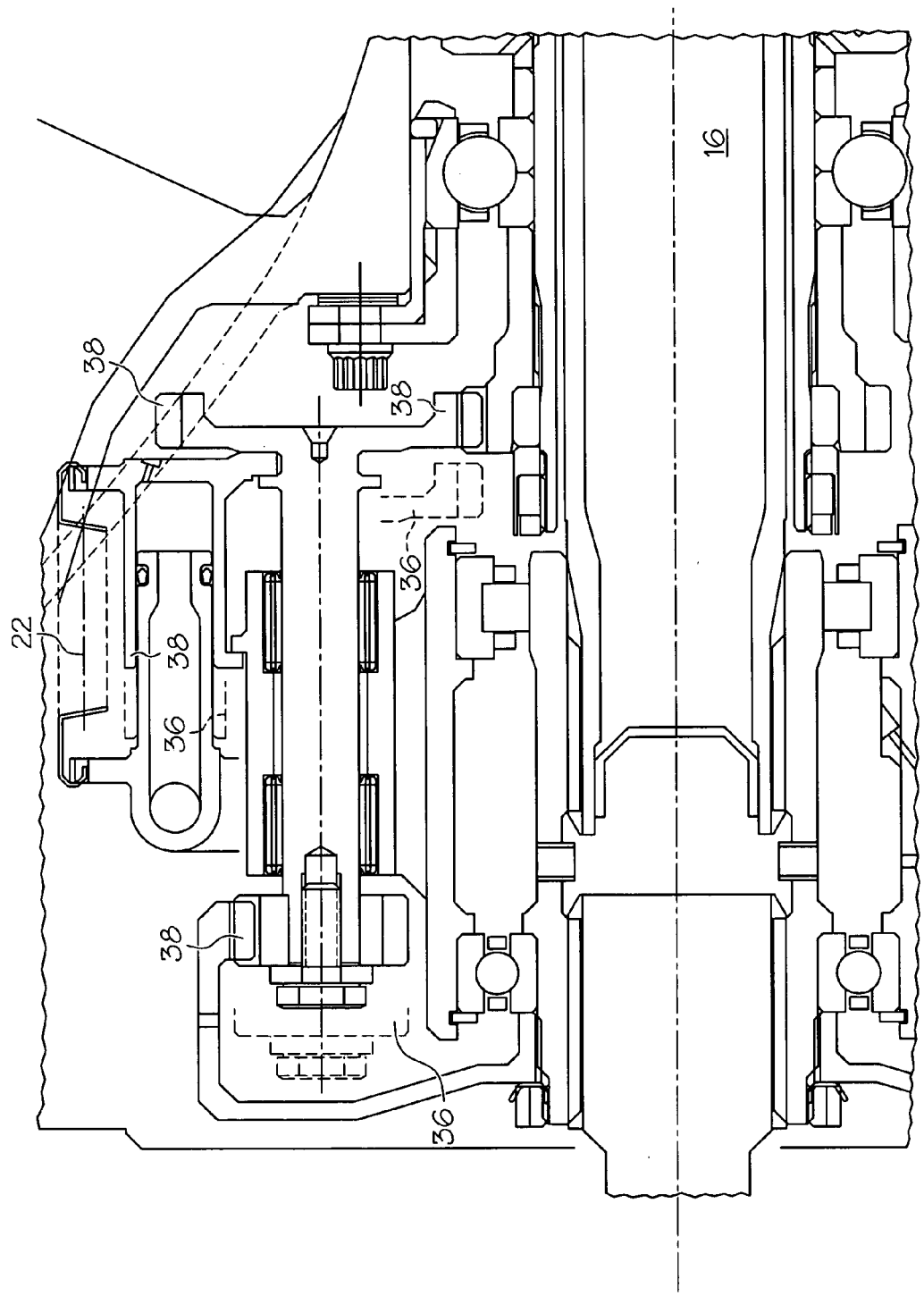
FIG. 3 is a close-up view of the partial cross-sectional drawing of FIG. 2.

Referring now to FIGS. 2 and 3, there are shown partial cross-sectional drawings depicting an engine layout having the drivetrain 10 shown schematically in FIG. 1. The dotted lined portions of FIGS. 2 and 3 indicate disengaged positions 36 of lay shaft 34 by actuator 22. In other words, when the drivetrain 10 is in the disengaged position 36, the engine 12 may be operating in normal mode and the motor-generator 14 is acting as a generator. However, with the drivetrain 10 in a start position 38, the engine 12 is in engine starting mode, the motor-generator 14 is acting as a motor to start engine 12, and the gas generator shaft 32 is oppositely rotationally coupled with the power turbine shaft 16.

Figure 4:
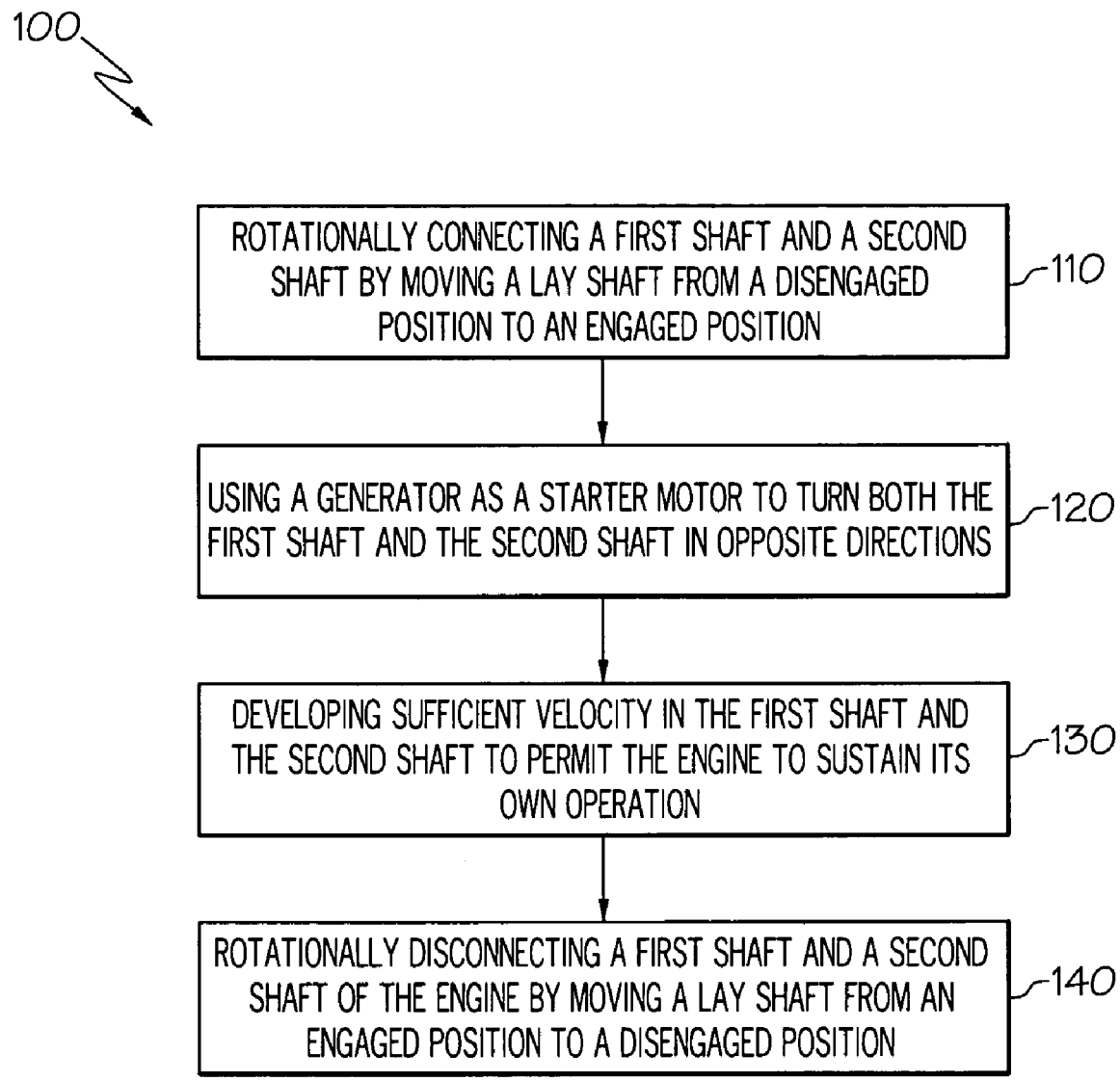
FIG. 4 is a flow chart showing a method according to the present invention.

Referring to FIG. 4, there is shown a flow diagram 100 outlining a method according to an embodiment of the present invention. Step 110 may involve rotationally connecting power turbine shaft 16 with gas generator shaft 32 by moving the lay shaft 34 from a disengaged position (as shown in lower part 11 of FIG. 1) to an engaged position (as shown in upper part 13 of FIG. 1). Step 120 may use the motor-generator 14 as a starter motor to turn both the power turbine shaft and the gas generator shaft in opposite directions. Step 130 may allow for the development of sufficient velocity in the gas generator shaft to permit the engine to sustain its own operation. Step 140 may rotationally disconnect the power turbine shaft from the gas generator shaft by moving the lay shaft into a disengaged position, thereby allowing free and independent rotation of the power turbine shaft and the gas generator shaft.

It should be understood, of course, that the foregoing relates to exemplary embodiments of the invention and that modifications may be made without departing from the spirit and scope of the invention as set forth in the following claims.

We claim:

1. A drivetrain of an engine comprising:
   a first shaft rotationally connected to a motor-generator;
   a second shaft rotationally connected to a gas generator; and
   a lay shaft movable between a start position, wherein the first shaft is rotationally connected to the second shaft, and a disengaged position, wherein the first shaft rotates independently of the second shaft.

2. The drivetrain according to claim 1, wherein:
   the first shaft is a power turbine shaft connected to the engine; and
   the second shaft is a gas generator shaft.

3. The drivetrain according to claim 1, wherein the engine has at least two spools.

4. The drivetrain according to claim 1, wherein the first shaft and the second shaft are counter-rotating.

5. The drivetrain according to claim 2, further comprising:
   a pinion gear on a first end of the lay shaft; and
   an intermediate gear on a second end of the lay shaft;

wherein the pinion gear is rotationally connected to the power turbine shaft and the intermediate gear is rotationally connected to the gas generator shaft.

6. The drivetrain according to claim 5, further comprising:
an internal gear rotationally connected to the power turbine shaft, the internal gear capable of mating with the pinion gear when the drivetrain is in the start position; and
a gas generator gear attached to the gas generator shaft, the gas generator gear capable of mating with the intermediate gear when the drivetrain is in the start position.

7. The drivetrain according to claim 6, wherein the number of teeth on each of the pinion gear, the internal gear, the intermediate gear and the gas generator gear are chosen to permit the gas generator shaft to achieve a sufficient rotational velocity in order for the engine to sustain its own operation.

8. The drivetrain according to claim 1, further comprising an actuator for moving the lay shaft from the start position to the disengaged position.

9. The drivetrain according to claim 8, wherein the actuator is a pneumatic actuator, a hydraulic actuator or a fueldraulic actuator.

10. The drivetrain according to claim 1, wherein the engine is part of a ground vehicle.

11. The drivetrain according to claim 2, wherein the power turbine shaft connects to the motor-generator via a generator shaft, the motor-generator shaft being rotationally coupled to the power turbine shaft via a spline connection.

12. A drivetrain of a two spool gas turbine engine comprising:
a first shaft rotationally connecting a motor-generator with the engine;
a second shaft rotationally connected to a gas generator;
wherein the first shaft rotates in a first direction opposite a second direction of rotation of the second shaft; and
a lay shaft movable between a staff position, wherein the first shaft is rotationally connected to the second shaft, and a disengaged position, wherein the first shaft rotates independently of the second shaft.

13. The drivetrain according to claim 12, further comprising:
a pinion gear on a first end of the lay shaft; and
an intermediate gear on a second end of the lay shaft,
wherein the pinion gear is rotationally connected to the first shaft and the intermediate gear is rotationally connected to the second shaft;
an internal gear rotationally connected to the first shaft, the internal gear capable of mating with the pinion gear when the drivetrain is in the start position; and
a gas generator gear attached to the second shaft, the gas generator gear capable of mating with the intermediate gear when the drivetrain is in the start position.

14. The drivetrain according to claim 12, further comprising an actuator for moving the lay shaft from the start position to the disengaged position.

15. The drivetrain according to claim 12, wherein:
the first shaft is a power turbine shaft; and
the second shaft is a gas generator shaft.

16. A drivetrain of a two spool gas turbine engine comprising:
a first shaft rotationally connecting a motor-generator with the engine;
a second shaft rotationally connected to a gas generator,
wherein the first shaft rotates in a direction opposite of the direction of rotation of the second shaft;
a lay shaft movable between a staff position, wherein the first shaft is rotationally connected to the second shaft, and a disengaged position, wherein the first shaft rotates independently of the second shaft;
a pinion gear on a first end of the lay shaft;
an intermediate gear on a second end of the lay shaft,
wherein the pinion gear is rotationally connected to the first shaft and the intermediate gear is rotationally connected to the second shaft;
an internal gear rotationally connected to the first shaft, the internal gear capable of mating with the pinion gear when the drivetrain is in the start position;
a gas generator gear attached to the second shaft, the gas generator gear capable of mating with the intermediate gear when the drivetrain is in the start position; and
an actuator for moving the lay shaft from the staff position to the disengaged position.

17. The drivetrain according to claim 16, wherein the number of teeth on the pinion gear, the internal gear, the intermediate gear and the gas generator gear are chosen to permit the first shaft to achieve a sufficient rotational velocity in order for the engine to sustain its own operation.

18. The drivetrain according to claim 16, wherein the actuator is a pneumatic actuator, an hydraulic actuator or a fueldraulic actuator.

19. The drivetrain according to claim 16, wherein the first shaft is connected to the motor-generator via a generator shaft, the generator shaft being rotationally coupled to the first shaft via a spline or other coupling device.

20. A two spool gas turbine engine comprising:
a first shaft rotationally connecting a motor-generator with the engine;
a second shaft rotationally connected to a gas generator;
wherein the first shaft rotates in a direction opposite of the direction of rotation of the second shaft; and
a lay shaft movable between a staff position, wherein the first shaft is rotationally connected to the second shaft, and a disengaged position, wherein the first shaft rotates independently of the second shaft.

21. The gas turbine engine according to claim 20, further comprising:
a pinion gear on a first end of the lay shaft; and
an intermediate gear on a second end of the lay shaft,
wherein the pinion gear is rotationally connected to the power turbine shaft, and the intermediate gear is rotationally connected to the gas generator shaft;
an internal gear rotationally connected to the power turbine shaft, the internal gear capable of mating with the pinion gear when the drivetrain is in the start position; and
a gas generator gear attached to the gas generator shaft, the gas generator gear capable of mating with the intermediate gear when the drivetrain is in the start position.

22. The gas turbine engine according to claim 20, further comprising an actuator for moving the lay shaft from the staff position to the disengaged position.

23. The gas turbine engine according to claim 20, wherein, during normal operation, the gas generator shaft rotates at about 50,000 rpm and the power turbine shaft rotates at about 30,000 to about 40,000 rpm.

24. A ground vehicle, comprising:
a gas turbine engine, the gas turbine engine having a drivetrain comprising:
a first shaft rotationally connecting a motor-generator with the engine;
a second shaft rotationally connected to a gas generator;
wherein the first shaft rotates in a direction opposite of the direction of rotation of the second shaft; and a lay shaft movable between a staff position, wherein the first shaft is rotationally connected to the second shaft, and a disengaged position, wherein the first shaft rotates independently of the second shaft, wherein the gas turbine engine drives a generator; and wherein the generator generates electrical power to drive the ground vehicle.

25. The ground vehicle according to claim 24, further comprising:

a pinion gear on a first end of the lay shaft; and an intermediate gear on a second end of the lay shaft, wherein the pinion gear is rotationally connected to the first shaft and the intermediate gear is rotationally connected to the second shaft;

an internal gear rotationally connected to the first shaft, the internal gear capable of mating with the pinion gear when the drivetrain is in the start position; and a gas generator gear attached to the second shaft, the gas generator gear capable of mating with the intermediate gear when the drivetrain is in the start position.

26. The ground vehicle according to claim 24, further comprising an actuator for moving the lay shaft from the start position to the disengaged position.

* * * * *

UNITED STATES PATENT AND TRADEMARK OFFICE
CERTIFICATE OF CORRECTION

PATENT NO. : 7,434,406 B2  
APPLICATION NO. : 11/126847  
DATED : October 14, 2008  
INVENTOR(S) : Christopher J. Herlihy et al.

It is certified that error appears in the above-identified patent and that said Letters Patent is hereby corrected as shown below:

Column 5, lines 35 and 66, "staff" should be changed to --start--;  
Column 6, lines 14, 35 and 54, "staff" should be changed to --start--;  
Column 7, line 1, "staff" should be changed to --start--.

Signed and Sealed this

Twenty-seventh Day of January, 2009

JOHN DOLL  
*Acting Director of the United States Patent and Trademark Office*